Patented Sept. 29, 1942

2,297,515

UNITED STATES PATENT OFFICE 2,297,515

SYSTEM FOR LANDING AIRCRAFT

Rudolf von Ottenthal, Berlin, Germany; vested in the Alien Property Custodian

Application April 6, 1940, Serial No. 328,253
In Germany April 28, 1939

4 Claims. (Cl. 250—11)

The copending patent application of W. M. Hahneman and E. Kramar Serial No. 244,440, filed December 7, 1938, Patent No. 2,241,907, granted May 13, 1941, relates to an arrangement that serves to produce rectilinear glide paths by means of very short waves, such glide paths being energy lines to be followed by aircraft for landing by radio control. In this arrangement the center of radiation of the spatial radiation pattern is located laterally with respect to a guide plane generated by a suitable guide beam beacon, for instance, and in which an airplane or other aircraft is to descend. This radiation pattern has a horizontal indent in the direction of landing. The said guide plane is positioned slantwise with respect to such indent in a manner to produce with the aid of the spatial radiation pattern straight energy lines of the same field intensity, these being the desired glide paths located in the guide plane.

The invention described hereafter has for its object so to develop this method that the glide path characteristic shall be effective in a number of directions at the same time, such as two directions which, for instance, are opposite to each other. The invention thus provides for solving a problem that has not been solved so far, namely, to produce several glide paths by means of a single arrangement.

Figure 1:
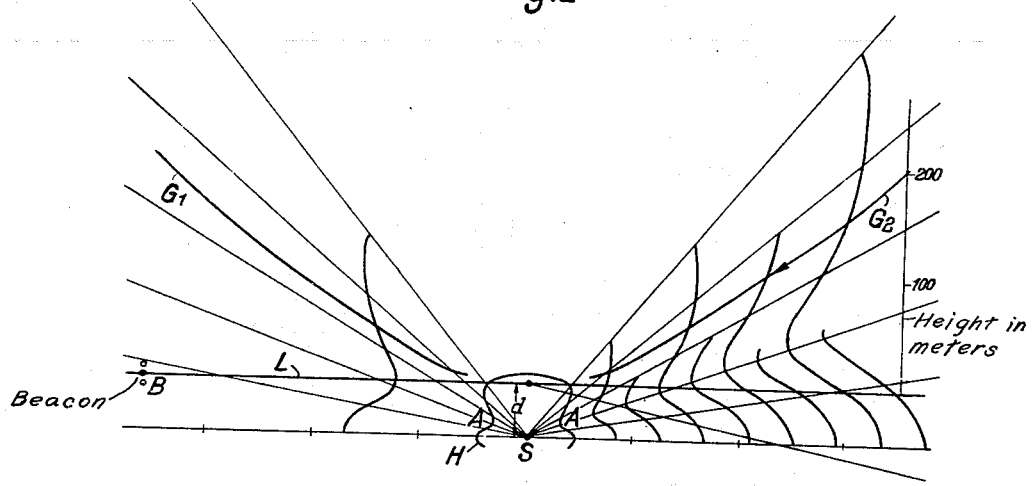
Figure 2:
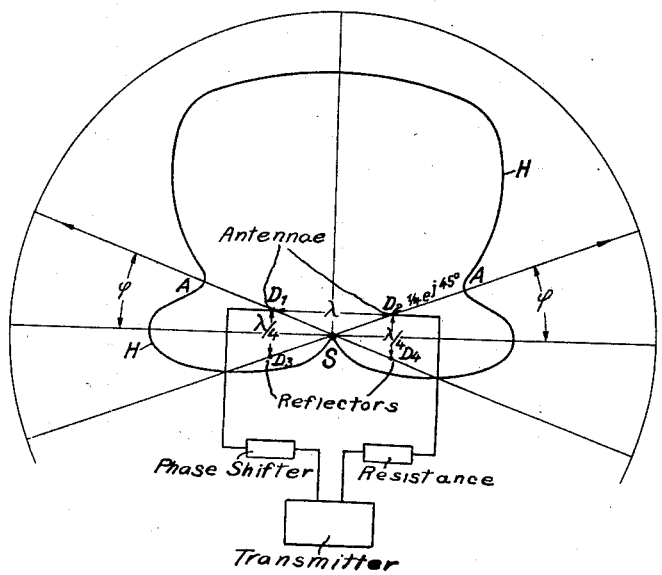

In the accompanying drawing, Fig. 1 shows the horizontal diagram of a radiation pattern suitable for the invention and also shows two glide paths represented in a plane which is perpendicular to the plane of this diagram, while Fig. 2 illustrates the same horizontal diagram and a diagrammatic plan view of an antenna system suitable for effecting the invention.

In Fig. 1 S denotes the center of radiation while L indicates the guide plane in which landing is to take place. In the case here represented by way of example landing can be effected along a rectilinear or substantially rectilinear glide path from either the right or the left in Fig. 1 or in both directions at the same time. The center of radiation S is spaced by a distance $d$ from a guide plane L in which aircraft is to descend. This guide plane may be generated in well known manner with the aid of any known beacon B, Fig. 1, for instance, the construction of which is not of interest here. The radiation pattern produced at S is in horizontal direction shaped as indicated by diagram H. Fig. 1 also shows curves $G_1$, $G_2$ which represent two substantially rectilinear glide paths. These curves, although located in the plane L, are here shown as located in a plane which is perpendicular to this. It will be seen that owing to the lateral symmetric position which the center of radiation S is given in relation to plane L, equivalent glide paths are produced. However, the arrangement may be made to be somewhat asymmetrical. This may be useful, for instance, where obstacles on the landing ground require the glide path to be displaced with respect to the middle thereof.

Fig. 2 again shows the horizontal diagram H and also represents vertical dipoles $D_1$, $D_2$, $D_3$, $D_4$. The dipoles $D_1$, $D_2$ are fed in well known manner from a suitable high frequency generator, and in the case here represented by way of example are spaced apart by a distance equal to the wavelength $\lambda$. The currents supplied to the dipoles $D_1$, $D_2$ are indicated in Fig. 2 to be in the ratio 1:4 and to be 45° out of phase with respect to one another. The dipoles $D_3$, $D_4$ are spaced from the dipoles $D_1$, $D_2$ by $\lambda/4$ and are coupled to them by radiation.

A plurality of diagrams similar to diagram H may be obtained by varying the mutual ratio and phase displacement of the currents supplied to $D_1$, $D_2$, the radiation itself being the same in each case. The nearer this ratio equals the value 1:1 the deeper will be the indents A of diagram H, and the nearer the phase displacement equals phase quadrature the smaller will be the minimum angle $\phi$. The depth of the indents A and their direction may hence be varied widely, thus allowing the glide paths to be adjusted according to local conditions.

What is claimed is:

1. A system for landing aircraft, which comprises a radio beacon for producing a guiding pattern defining a plane in a given azimuthal direction, and means spaced from said plane for producing a radiation pattern having a predetermined curve of constant intensity in a vertical direction and being directed in a different azimuthal direction to intersect said plane, said last named means comprising radiation means for producing a radiation pattern having a center of radiation spaced from said plane and a plurality of symmetrical indents terminating in radiation minimum points in the horizontal plane, a line from the center of radiation of said system through the radiation minimum points being angularly disposed with respect to the line defined by said plane, and the radiation pattern being of such field strength that the constant intensity lines formed in said plane by said radiation pattern produce substantially rectilinear lines inclined to the landing surface, equal in number to the number of said indents in said radiation pattern.

2. A system according to claim 1, wherein said radiation means comprises two dipoles, from a high frequency generator for feeding said dipoles, and reflecting dipoles cooperating with the first said dipoles.

3. A system according to claim 1, wherein said radiation means comprises two dipoles, a high frequency generator for feeding said dipoles, means for rendering the current in each of them different from that in the other dipole, and reflecting dipoles for cooperating with the first named dipoles.

4. A system according to claim 1, wherein said radiation means comprises two dipoles, a high frequency generator for feeding said dipoles, means for rendering the current in each of them different from that in the other dipole and out of phase therewith, and reflecting dipoles for cooperating with the first dipoles.

RUDOLF von OTTENTHAL.